(12) United States Patent
Held

(10) Patent No.: US 6,525,712 B1
(45) Date of Patent: Feb. 25, 2003

(54) METHOD AND DEVICE FOR MANUAL RECORDING OF VARIOUS EVENTS OR STATES

(76) Inventor: Jurgen Held, Sempacherstrasse 75, CH-6032 Zurich (CH)

(*) Notice: Subject to any disclaimer, the term of this patent is extended or adjusted under 35 U.S.C. 154(b) by 0 days.

(21) Appl. No.: 09/387,780

(22) Filed: Sep. 1, 1999

(30) Foreign Application Priority Data

Sep. 1, 1998 (EP) ............................................. 98116525

(51) Int. Cl.$^7$ ................................................. G06F 3/14
(52) U.S. Cl. ........................ 345/156; 345/179; 345/863; 345/864; 345/780
(58) Field of Search ................................. 345/156, 173, 345/179, 863, 864, 702, 700, 780; 382/187, 188, 189, 186

(56) References Cited

U.S. PATENT DOCUMENTS

| | | | |
|---|---|---|---|
| 3,757,322 A | * 9/1973 | Barkan et al. ............... | 345/174 |
| 4,870,677 A | 9/1989 | Di Santo et al. | |
| 4,885,580 A | 12/1989 | Noto et al. | |
| 4,908,845 A | 3/1990 | Little | |
| 5,059,960 A | 10/1991 | Rosenberg et al. | |
| 5,113,041 A | 5/1992 | Blonder et al. | |
| 5,223,677 A | 6/1993 | Kapp et al. | |
| 5,250,929 A | * 10/1993 | Hoffman et al. ............. | 345/146 |
| 5,300,943 A | * 4/1994 | Jakobs et al. .................. | 345/1 |
| 5,422,656 A | 6/1995 | Allard et al. | |
| 5,572,573 A | * 11/1996 | Sylvan et al. ................ | 455/556 |
| 5,594,471 A | * 1/1997 | Deeran et al. ............... | 345/173 |
| 5,617,114 A | * 4/1997 | Bier et al. ................... | 345/113 |
| 5,781,179 A | * 7/1998 | Nakajima et al. ............ | 345/157 |
| 6,133,906 A | * 10/2000 | Geaghan et al. ............. | 345/179 |

FOREIGN PATENT DOCUMENTS

| | | |
|---|---|---|
| EP | 0 404 541 | 12/1990 |
| EP | 0 591 083 | 4/1994 |
| EP | 0 635 779 | 1/1995 |
| EP | 0 672 981 | 9/1995 |
| WO | WO 94/03861 | 2/1994 |

OTHER PUBLICATIONS

Applied Ergonomics, vol. 25, No. 6, pp. 398–399, "Tools and Techniques", 1994.

* cited by examiner

Primary Examiner—Kristine Kincaid
Assistant Examiner—Thomas T. Nguyen
(74) Attorney, Agent, or Firm—Oblon, Spivak, McClelland, Maier & Neustadt, P.C.

(57) ABSTRACT

A method for manually recording various observed events or states by an observing person which includes subdividing the various events or states into a plurality of classes in such a way that each of the various events or states can be assigned to a class, representing an object on a two-dimensional template for each class, and arranging the template in such a way with respect to a two-dimensional input panel of a data acquisition device that an input signal is generated upon manual actuation of the template. The method also stores a characterizing data record of the input signal comprising coordinates of points touched during the manual actuation of the template, and evaluates the characterizing data records and assigns each recorded event or state to a class after termination of the observation and the manually recording.

18 Claims, 11 Drawing Sheets

METHOD AND DEVICE FOR MANUAL RECORDING OF VARIOUS EVENTS OR STATES

FIELD OF THE INVENTION

The invention relates to a method for manual recording of various observed events or states by an observing person. The invention further relates to a data acquisition device for carrying out the method.

DISCUSSION OF THE BACKGROUND

It is known to observe nature, sequences in systems or, for example, the activities or behavior of living beings, in particular of human beings, and in so doing to record specific events or states, in order subsequently to analyze and systematically evaluate in accordance with specific criteria the observations collected in the process. Such data are collected by outside observation or self-observation, in particular in psychological, sociological or ergonomic studies.

Computers, including portable ones are currently preferably used to carry out such observations. In a known arrangement, the keyboard of the computer is used for data input by assigning each key a context, and in the case of observing an event the event occurring is acquired by pressing the appropriate key and stored by the computer, preferably together with the instant of the key depression.

Such a unit and/or such a method has the following disadvantages:

Operating the unit requires a high outlay on learning and training, since the meaning and/or assignment of each key firstly have to be learned. This considerable learning outlay is particularly disadvantageous when use is made for the data acquisition of people who have no experience of operating computers, who are relatively old or very young, or who come from a different cultural milieu or another speech area. There is also the risk of erroneous inputs despite the considerable learning outlay.

The arrangement of the keyboard, and/or the user interface does not correspond to the ideas and/or the mental model of the user.

It can happen that different situations to be observed require different application programs for the data acquisition and/or different electronic units which possibly have a different keyboard layout, and this complicates the flexibility and operation.

The known disadvantages also cause an increased outlay in time and costs.

SUMMARY OF THE INVENTION

It is the object of the invention to create a method and a device for manual recording of various events or states which can be operated simply.

The object is achieved in particular, with the aid of a method for manual recording of various events or states, wherein these are subdivided into a plurality of classes in such a way that each event/state can be assigned to a class, wherein a two-dimensional, freely configured and freely arranged object is represented on a two-dimensional template for preferably each class, wherein the template is arranged in such a way with respect to a two-dimensional input panel of a data acquisition device that an input signal is generated upon manual actuation of an object, wherein a data record characterizing the input site in the input panel and in particular comprising the coordinates and preferably also the instant of actuation is stored, and wherein after termination of the manual recording the characterizing data records are evaluated and each recorded event/state is assigned to a class.

In an advantageous refinement of the method according to the invention, the situation to be observed and recorded is put down on a sheet of paper, also denoted below as a template, on which the observing person, termed observer below, records context-oriented fields and/or objects on the sheet of paper, each class usually being represented as a context-oriented field and/or as an object, and it being left to the discretion of the observer to configure the graphical lay-out of the fields, possibly additionally characterized by different colors or supplementary text, and to configure the arrangement of the fields in accordance with the personal ideas and/or the personal mental model. As soon as all the context-oriented fields are drawn in, the sheet of paper is fastened on a flat input panel of a data acquisition device, the input panel being configured, for example, as a pressure-sensitive input interface which permits the input site to be resolved into an X-coordinate and Y-coordinate, and be stored. During observation and acquisition of an activity, the observer taps in the event accordingly on one of the self-designed fields on the sheet of paper, the data acquisition device storing the X-coordinate and Y-coordinate and preferably also the instant of data input. The data are input, for example, by virtue of the fact that a finger or the tip of a stylus is used to press onto the sheet of paper. After the termination of the observation, the data are evaluated, each field being assigned the corresponding event. The data acquired can, for example, be represented on a display screen by representing the X-coordinate and Y-coordinate of each data input as a data point, so that it is possible on the basis of the resulting cluster formation very easily to detect, and during the evaluation to determine, which data points belong to which field and/or to which event.

Advantages of the method according to the invention are to be seen, for example:

in that an observer is free to arrange the objects and to configure the user interface of the data acquisition device;

in that the arrangement of the objects corresponds to the mental model of the user;

in that a simple, unambiguous and reliable operation of the data acquisition device is possible;

in that the data can be input very quickly into the data acquisition device;

in that erroneous inputs can be established by testing whether the coordinates of the input data points are situated inside the fields drawn;

in that the data acquisition device essentially comprises an input panel and a storage means, and therefore can be produced with a low weight and small external dimension;

in that the method can be matched in a simple way to different data acquisition tasks; and in that when recording spatially variable events (for example: recording movement) there is a relationship between the observed space and the input panel and/or the user interface of the data acquisition system.

The input interface is configured as a two-dimensional, preferably plane input panel which permits detection of the input site in the input panel. The input site is stored as a characterizing data record, this data record comprising the coordinates of the input and, preferably, the instant of the input. The input panel can be implemented using various technologies. Thus, the input panel can be configured, for example, as a plate made from metal or plastic, which is coupled to appropriate pressure sensors, touch sensors or light sensors for the purpose of input detection. Such input panels are also denoted as touch pads. The input interface can also comprise a display device, in particular an LCD display, which is arranged below the input panel. Such an input interface is also denoted as a touchscreen, this being taken to include any type of display screens and/or display devices which permit detection of an input based on approach, touch or pressure. Such input panels can have the most varied acuities, thus for example an acuity of 500×500 points.

The two-dimensional template can also, for example, be configured such that it comprises a sheet of paper which can be written on, or a transparent film which can be written on and which is surrounded by a fixed rim, for example made from cardboard, and is permanently connected to said rim. The two-dimensional template configured in such a way with a rim has, for example, the advantage that if the data input device has an appropriate stop in the region of the input panel the template can be positioned very accurately and reproducibly with reference to the input panel.

In the present patent application, the term "two-dimensional template" is taken to mean not only the template which is configured from paper, in particular, but also a representation on the display screen such as a touchscreen. Starting from the inventive idea, what is involved is an equivalent use of the template, be this represented with the aid of a thin carrier material which can be written on, such as paper, or with the aid of an electronic display device such as an LCD display screen. In a fashion equivalent to the template consisting of paper, an observer can draw context-oriented fields in a first step on a touchscreen and graphically configure them, the representation being performed via the LCD display screen, in order in a subsequent step to acquire the data by touching these defined fields.

The method according to the invention thus permits an observer to configure an electronic unit for data acquisition in a simple way, to configure or amend the user interface himself in a simple way, and thus to configure an input system which is self-evident for him, can be operated simply, unambiguously and reliably, permits data to be acquired quickly, and is suitable for the most varied recording tasks.

BRIEF DESCRIPTION OF THE DRAWINGS

The invention is explained below with the aid of a plurality of exemplary embodiments. In the drawing.

DESCRIPTION OF THE PREFERRED EMBODIMENTS

Figure 1:
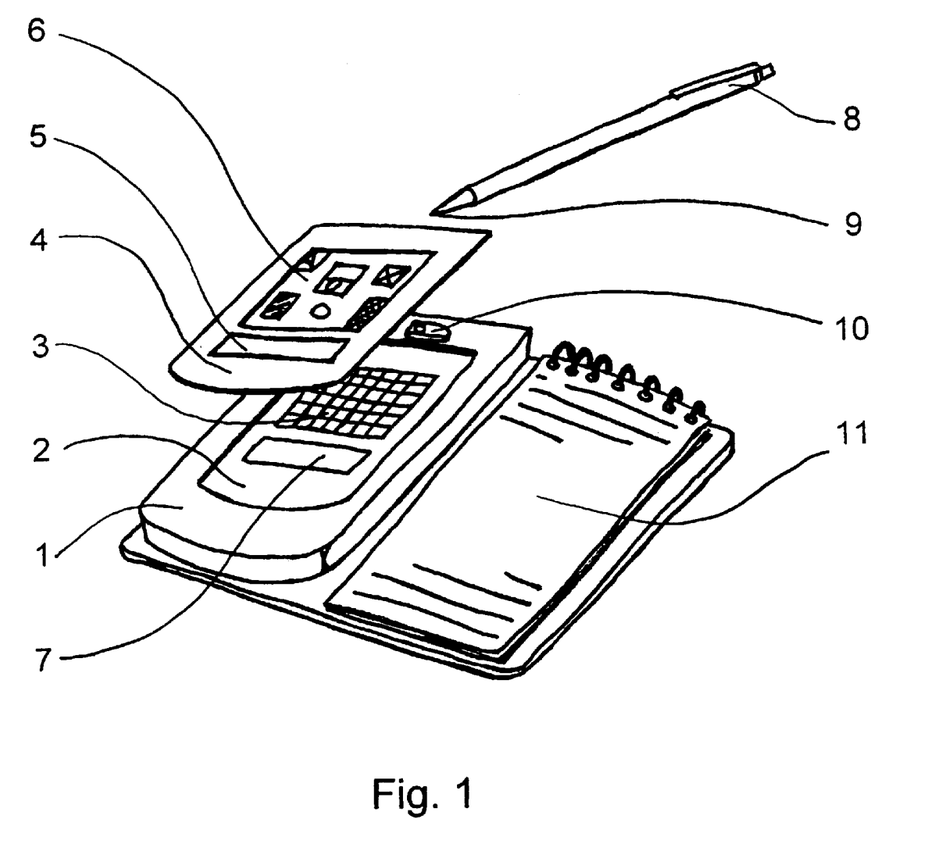
FIG. 1 shows a perspective view of a data acquisition device with a template.

FIG. 1 shows an exemplary embodiment of a data acquisition device 1 with a template 4 configured in a correspondingly matched fashion. The data acquisition device 1 has a two-dimensional, touch-sensitive input panel 2 which permits touching or actuation of the input panel to be detected, and the input site to be stored in the form of coordinates as well as the instant of actuation to be recorded. In the exemplary embodiment represented, a display, in the form of an LCD display, is placed behind the input panel 2, with the result that the data acquisition device 1 is additionally capable of carrying out a display on the input panel 2. Such an input panel is also denoted as a touch-sensitive display surface or a touch screen. The mode of operation of such devices with touch-sensitive display surfaces is known from the prior art and will therefore not be explained in more detail.

Represented above the data acquisition device 1 is a template 4 which is configured, for example, from a 2 mm thick cardboard which has two cutouts, an input/output zone 5 and an input zone 6. The input zone 6 of the template 4 consists of a thin material to which characters and drawings can be effectively applied. This material is preferably a white paper or else a plastic film which can be inscribed effectively, in particular a transparent one. This input zone 6 forms the actual user interface during observing and acquiring the data. The input/output zone 5 can be configured as a continuous cutout or as a zone made from a thin, transparent material such as, for example, paper or plastic. The input/output zone 5 serves for inputting control commands or, for example, for displaying certain status reports of the data acquisition device 1, in order to prepare or terminate data acquisition. The actual acquisition of the data during observation is performed via the input zone 6.

Before the start of the actual data acquisition, the user and/or observer can freely configure the entire input zone 6 of the template 4 in accordance with his own ideas and with the prescribed observing task. In accordance with his individual mental model of the situation to be observed, and/or his habit and his personal representational abilities, the user can, as indicated in the input zone 6, make use for representational purposes of drawings, sketches, symbols, texts, abbreviations, patterns and colors.

In advance of the data acquisition, the user has acquainted himself for this purpose with the requirements and the surrounding situation of his investigative task. He can express the orientation acquired in this process by means of the process described for laying out the input zone 6, doing so as directly as possible and in a form which for him is self-evident and self explanatory. The concept of the user interface therefore corresponds largely to the so-called mental model which the user has formed for himself in order to master his task of data recording. A substantial advantage of the invention by comparison with known acquisition devices resides therein. This advantage ensures reliable and quick operation and a reduction in the cognitive loading of a user, who needs to rethink less during operation. Also, the time period which the user would require in order to acquaint himself with a user interface which does not correspond to his concept of operation is eliminated. A further advantage of the free use of graphic representations, in particular the use of colors, resides in the fact that these possibilities are not to hand with other solutions with data acquisition, because of the small design of the device, the weight and the costs.

The input panel 2 of the data acquisition device 1 is arranged in a slightly depressed fashion, and the outer border of the template 4 is configured to match the course of the depression, with the result that the template 4 can be fixed on the input panel 2 in a simple way which fits and is uniquely defined in its position. A swivel arm 10 serves to fix the template 4 in an additional, detachable fashion. The template 4 with input zone 6 can thus be laid out by an observer completely independently of the data acquisition device 1, the template 4 being fastened after its completion to the data acquisition device 1. The as yet unconfigured, empty template 4 could, however, also already be connected in advance to the data acquisition device 1, whereupon the input zone 6 is laid out. An equivalent embodiment for this purpose would be for the template 4 not to be configured as a separate unit, but to be represented on the display surface of the input panel 2 so that, for example with the aid of a pen 8, the input zone 6 is drawn directly onto the display surface of the input panel 2 in which the movements made by the pen 8 are represented as lines on the display.

After completion of the template 4, the data acquisition device 1 is switched over into its acquisition mode. The application program for data acquisition detects the signals, generated by touching the input panel 2, of the touch-sensitive input panel 2, and is capable of storing the position of the coordinates of the touch point and, if appropriate, further data such as the instant of touching. In place of the coordinates, the input panel 2 can also be subdivided into individual fields 3 which are defined by the application program below the input zone 6 of the template 4. These fields 3, which are also denoted below as virtual fields, can be freely generated as to their size and number by said application program.

Each touch in the input zone 6 of the template 4 is stored as a coordinate of the corresponding field 3 of the touch-sensitive input panel 2, provided additionally with the date and the time, if appropriate.

The user receives a visual and/or audible feedback from each of his inputs into the input zone 6. The visual feedback is performed in this case by the input/output area 7 of the touch-sensitive display surface 2 in the region of the input/output zone 5 of the template 4.

Owing to its material, or its production or its definition, the template 4 has regions with different optical properties, with the result that on the one hand the input zone supplies a good background relative to the graphical layout, but on the other hand the input/output area 7 of the feedback can be read off. Specific regions of the touch-sensitive display surface 2 can thereby be covered from the view of the user, and thus the attention can be directed to the important elements of the input zone 6 and the feedback of the input/output area 7 in the input/output zone 5. An exemplary embodiment of the invention having a template 4 with regions of different wall thicknesses further permits a signal to be released on the touch-sensitive surface 2 only in the input zone 6 by touching with the pen 8. Further conceivable functions of the electronic acquisition device which are not directly associated with data acquisition can thus be covered up and protected against being activated erroneously. A simple design of the template 4 results from using paper of different thickness. Thus, a 1–2 mm thick opaque cardboard forms the frame of the template 4, while the input zone consists of thin, white paper which is laid or bonded into a corresponding cutout in the frame. In order to be able to read off the input/output area 7, the cardboard of the template 4 can be cut out at the appropriate point. However, it is also conceivable to use a template 4 made from plastic. The input zone 6 could then be laid out using washable inscriptions and drawings, the result being that the template can be reorganized more easily and used more often.

Also conceivable as detachable connection 10 is a template made from plastic or paper, which is applied self-adhesively to the touch-sensitive display surface 2 and can be removed again without residues.

Since the template 4 can easily be replaced by hand via the detachable connection, it is possible to meet different requirements during the recording process with the aid of different templates, or else for different recording processes to be carried out quickly one after another.

Figure 2:
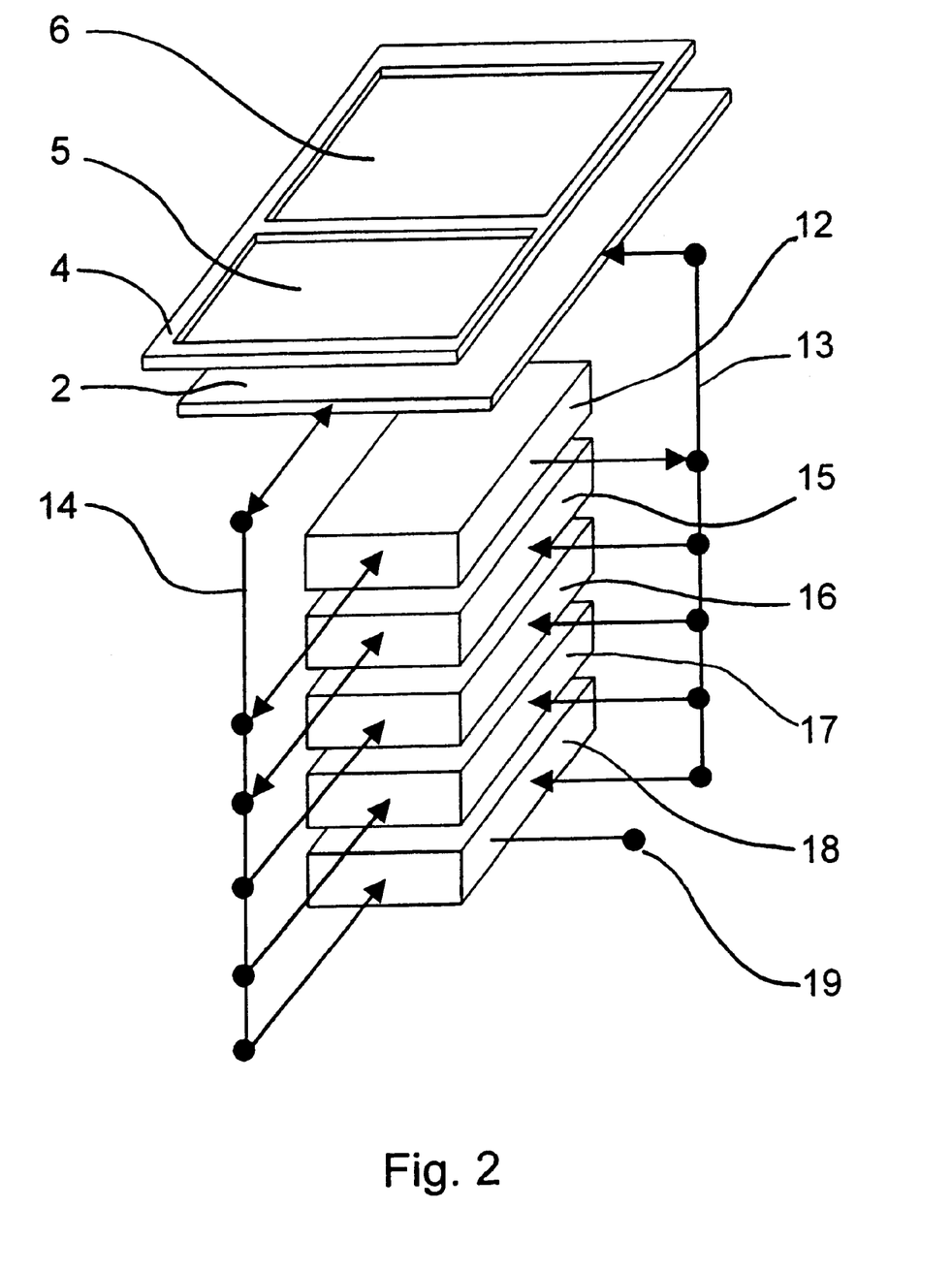
FIG. 2 shows a diagrammatic representation of the structure of the data acquisition device.

The electronic data acquisition device 1 is of very small design, with the possibility of attaching a notepad 11 at the side. In accordance with FIG. 2, the device 1 has in principle the structure of an electronic data processing device having the elements of a processor 12, a control line 13 and a data line 14. A memory 15 is connected to the processor 12 via the control line 13 and the data line 14. This memory serves to store the acquired data, to store the application program for data acquisition, and to store further program routines for operating the electronic device 1. The touch-sensitive input surface 2, an output unit for outputting audible signals 16, an additional input unit 17, and an output unit 18 for data transfer via a data interface 19 to an external unit are likewise connected as electronic components of the electric device to data and control lines of the processor 12.

The pen 8 for data input is provided in accordance with FIG. 1 with a refill cartridge 9 which can be retracted and extended. It is therefore possible to alternate quickly between recording the data with a retracted cartridge on the input zone 6 of the template 4, and taking a note of data with an extended refill cartridge 9 on the notepad 11.

This pen 8 also forms a tool for representing by writing and drawing on the input zone 6 of the template 4, with the result that the user interface can be spontaneously supplemented and improved during the recording process, for example by drawing in an additional object.

The data stored in the electronic device 1 are evaluated in the electronic device itself or, for example, on a larger computer system such as a personal computer.

At the start of the evaluation, the stored data are visualized as subsets in accordance with the acquired coordinates of the input fields, with the result that the user can assign these subsets a meaning with the aid of the layout of his template. The assignment, thus rendered possible, between coordinates of the acquired input fields, time datum and meaning form the basis of the further statistical and graphical evaluation and preparation of the acquired data.

Figure 3:
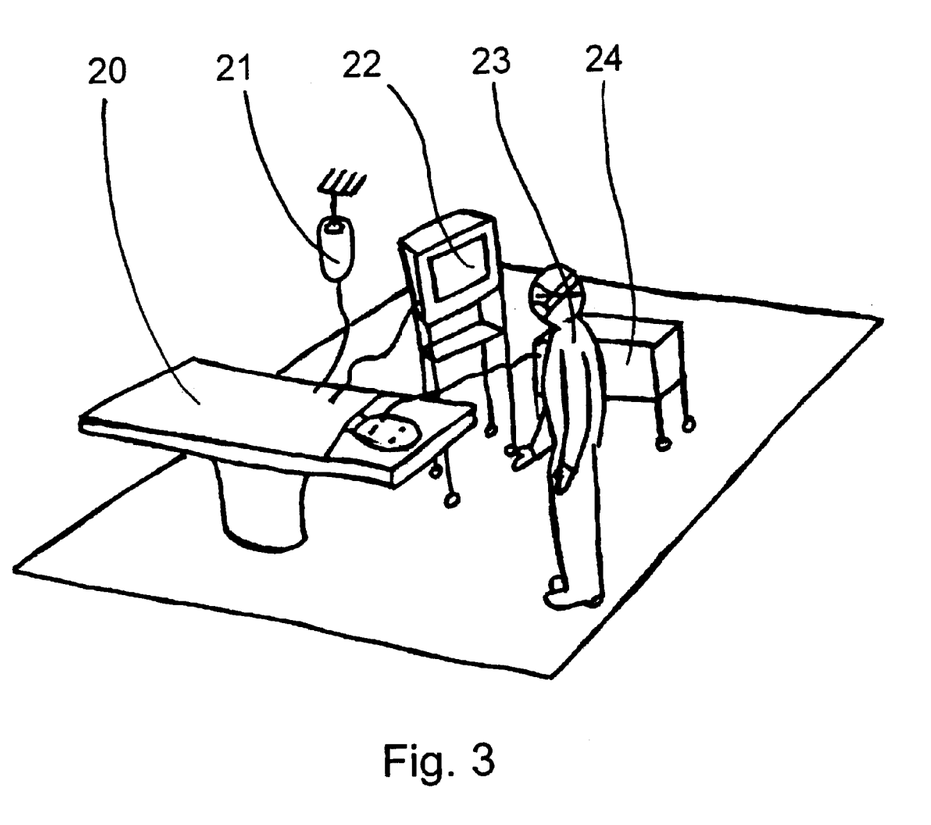
FIG. 3 shows an example of an activity to be observed.
Figure 4:
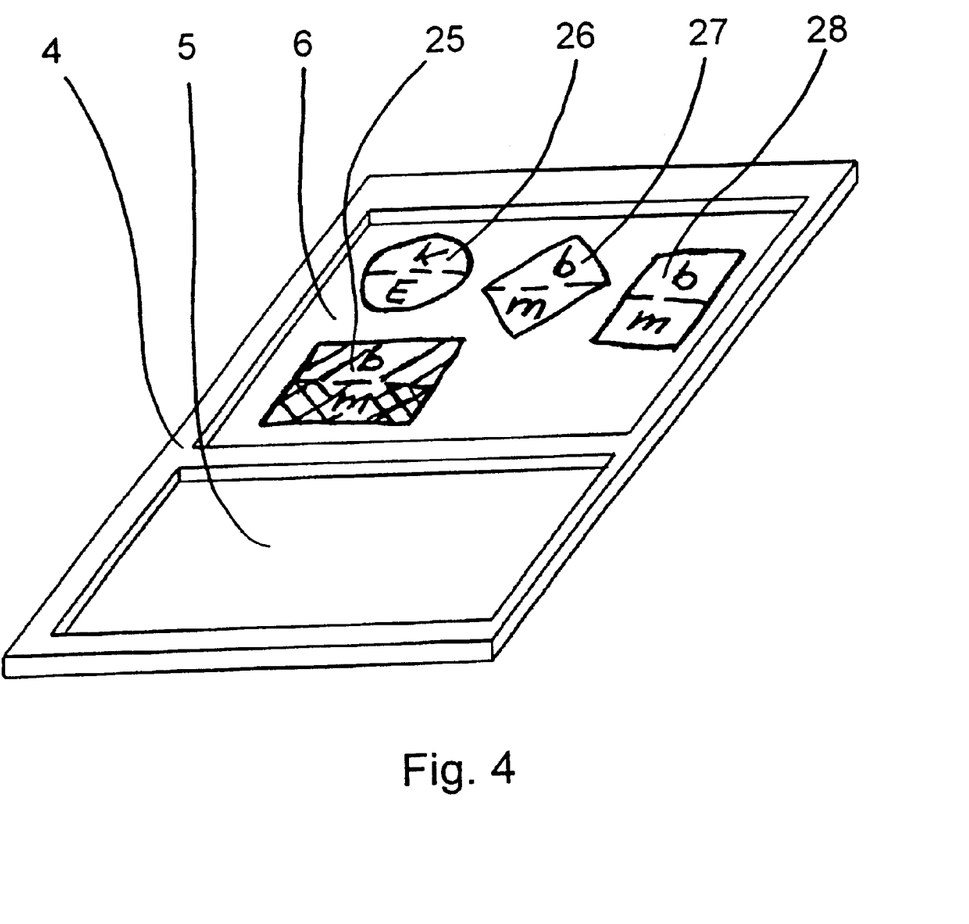
FIG. 4 shows a configuration of the user interface or of the template for an activity to be observed in accordance with FIG. 3.
Figure 5:
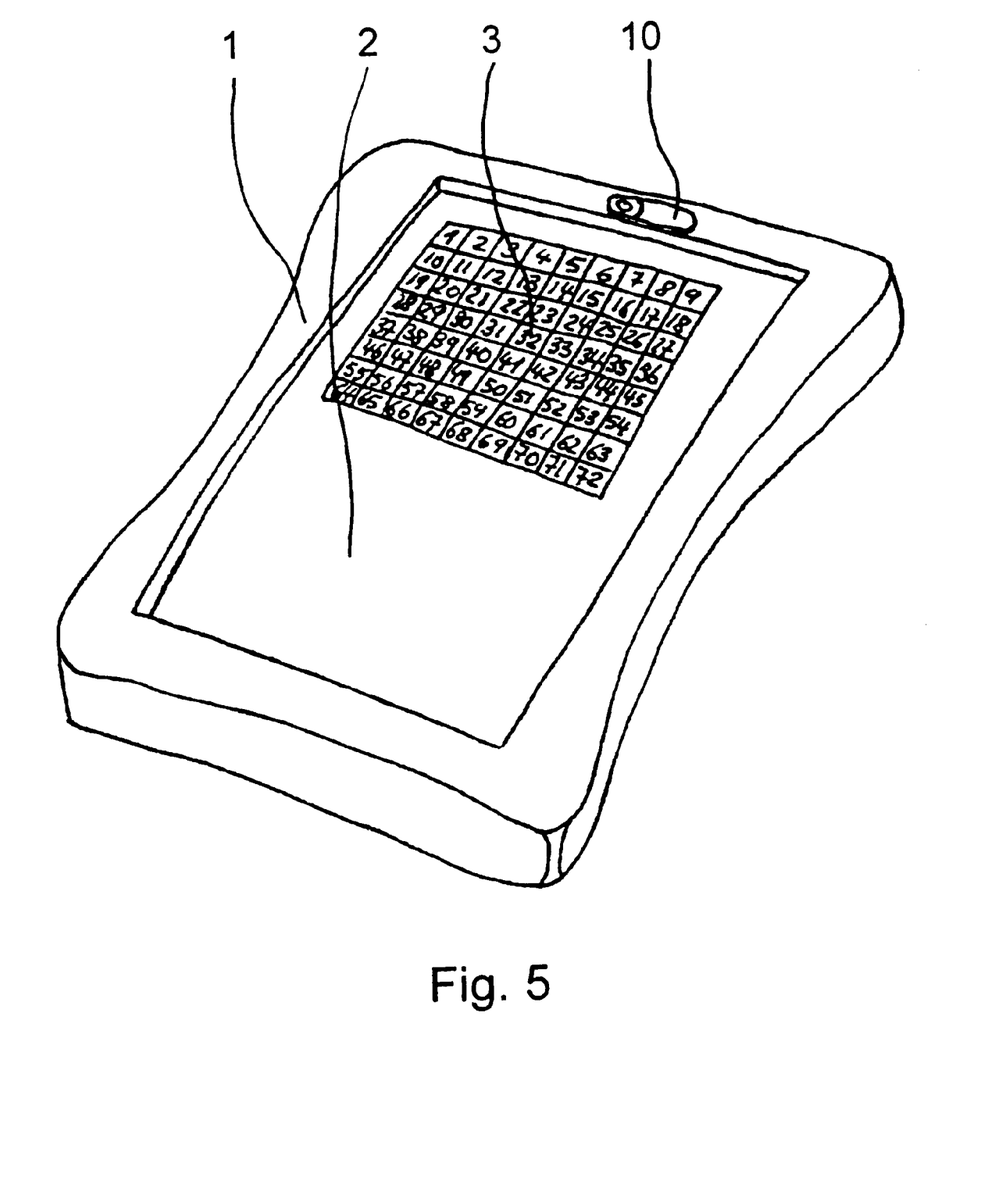
FIG. 5 shows the number, arrangement and enumeration of the virtual fields of an input panel.

FIG. 3 to FIG. 5 show an example of data acquisition with the aid of the method according to the invention. The aim is to observe the working system represented in FIG. 3 so as to acquire data for judging it ergonomically. FIG. 3 shows as an example a diagrammatic, perspective representation of an anesthetic workplace in an operating room of a hospital. It represents the patient 20, an infusion 21, a monitor 22, the anesthetist 23 and a respirator 24.

The observer's task is to record the temporal sequence of the anesthetist 23's activities. After a short examination of the workplace in accordance with FIG. 3 and a few inquires of the anesthetist, the observer selects the following classes as temporally variable events and/or states important for the observation from existing activity elements:

a) Observation of the patient.
b) Observation of the monitor.
c) Observation of the respirator.
d) Manipulation at the patient.
e) Manipulation at the monitor.
f) Manipulation at the respirator.
g) Monitoring of the infusions.
h) Replacement of the infusions.

The observer thereupon lays out the input zone 6 of the template 4 in the form of representation which appears to him to be most suitable. In the example represented in accordance with FIG. 4, the observer has the obvious idea of representing all classes of the workplace which are to be recorded as objects in such a way that the latter are presented to one another in their spatial arrangement in the same way as to the observer. One advantage of this arrangement is to be seen in that in addition to the activity as such, it is also possible to record the movement of the anesthetist in space. It is therefore possible in the later evaluation subsequently to draw the movements of the anesthetist via the stored data. In addition, the observer subdivides the illustrated objects of patient symbol 25, infusion symbol 26, monitor symbol 27 and respirator symbol 28 in such a way that they comprise two classes in each case, the initial letter b denoting an observing activity, and the initial letter M denoting a manipulating activity. The input zone 6 laid out in such a way is represented in FIG. 4, it being possible, in addition, to make use of colors and cross hatching as well for the purpose of better representation.

In the represented example in accordance with FIG. 5, the input panel 2 has a matrix of 9×9 virtual fields (3) which are arranged below the input panel 6 of the template 4. In the evaluation following the measurement, the following relationship would exist between the object and/or actuated field and the corresponding classes, as represented in Table 1:

TABLE 1

| Number (n) of the fields (3) | Meaning of the class |
| --- | --- |
| 28, 29, 30, 31 | Observation of the patient |
| 37, 38, 39, 40 | Manipulation of the patient |
| 11, 12 | Monitoring of the infusions |
| 20, 21 | Replacement of the infusions |
| 14, 15 | Observation of the monitor |
| 22, 23 | Manipulation of the monitor |
| 25, 26 | Observation of the respirators |
| 34, 35 | Manipulation of the respirator |

The user activities so far described in laying out the input zone 6 and relating to the definition of the classes and the assignment represented in Table 1 do not constitute a real-extra outlay by comparison with the previously known methods of data acquisition, since what is involved here are considerations which have to be made in the case of any other data acquisition project as well. Finally, it is frequently to be observed that those involved in a project form "a picture" of the corresponding situation by providing themselves with a better overview with the aid of sketches. This picture corresponds, however, to the laid-out input zone 6.

For the actual data acquisition, the observer needs only to tap on the objects illustrated in FIG. 4. Additional inputs are not required, since all inputs are stored with the current time datum. He can advantageously devote his attention virtually completely to the work cycle carried out by the anesthetist. The user can record the data quickly and reliably owing to the direct agreement of the real situation at the workplace with his imaginary idea and the, in turn, real depiction of this idea on the input zone 6.

Figure 7:
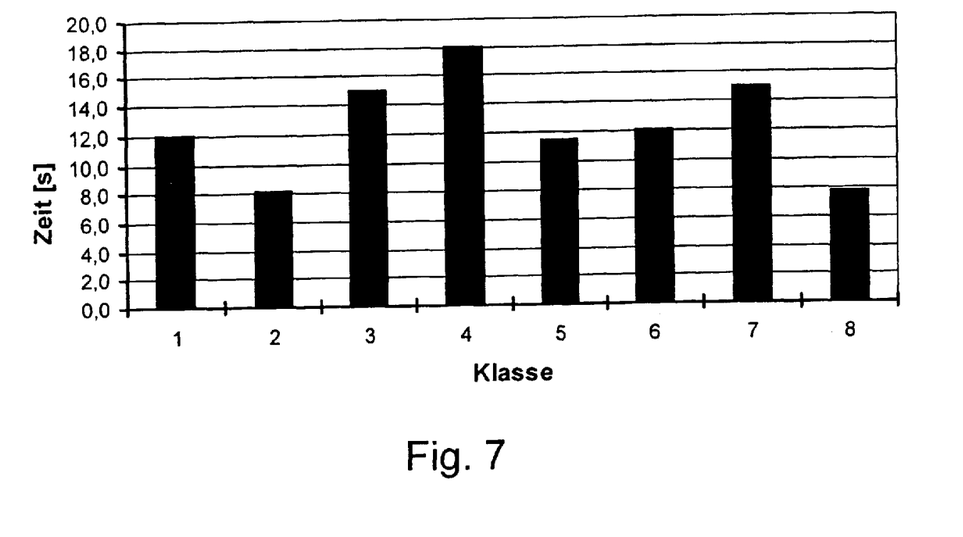
FIGS. 7, 8 show a further example with representations of results of the observation.
Figure 8:
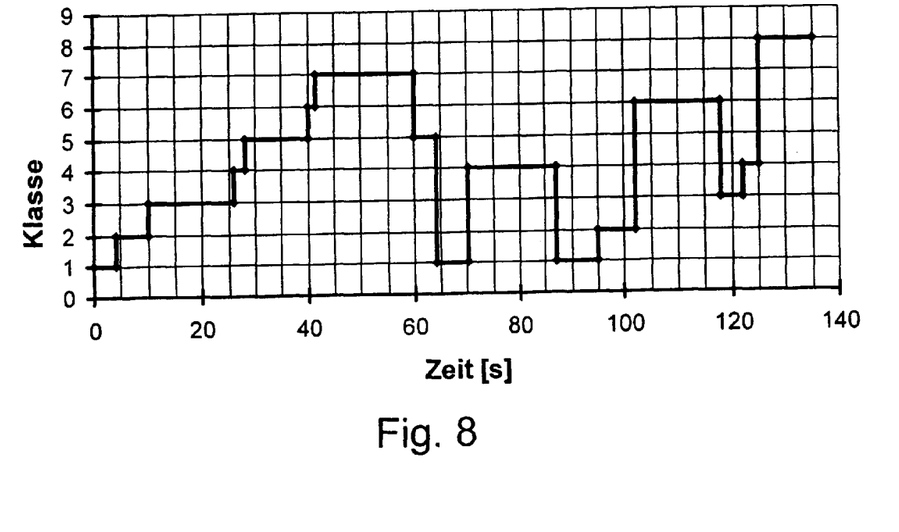

The data are stored in this exemplary embodiment in a sequentially structured file. An identification is conceivable at the start of this file. In the example presented here, in conjunction with the application program the operating system of the data acquisition device 1 permits the acquired datasets of different workplace studies or a plurality of studies at one workplace to be managed. Likewise, transmission of data to external devices for data processing is rendered possible by this operating system. FIG. 7 shows an exemplary evaluation of the acquired data. The eight different classes defined in FIG. 4 are represented in FIG. 7 on the axis of abscissae, whereas the average sojourn time of each class is represented on the axis of ordinates. FIG. 8 shows a further example of the evaluation, in which time is represented on the axis of abscissae and the eight different classes are represented on the axis of ordinates, so that the temporal sequences of the classes and/or activities may be seen from the representation in accordance with FIG. 8.

In the data evaluation of the selected exemplary embodiment, the user firstly obtains the possibility of once again assigning the corresponding class and/or the corresponding meanings in accordance with the template 4 from FIG. 4 to the acquired fields, as these are given, in addition, in accordance with Table 1. The evaluation is therefore based on times and meanings which are sequentially interconnected and correspond to the observed operating sequence, and the coordinates of the fields 3. Since there is a spatial relationship in this exemplary embodiment between the coordinates of these fields and the workplace, it is also possible as a result of the evaluation to represent the paths walked at the workplace in a directly graphical fashion.

In a further exemplary embodiment of the invention, in the application program of the data acquisition device 1 the user can, in a definition mode to be carried out once, successively tap the laid-out objects of his input zone 6 even before the acquisition of the events, and assign them the appropriate meaning with the aid of the electronic device 1 via input into the input/output area 7. This meaning is then stored during acquisition in addition to the coordinates of the field 3 of the input and the time datum. The later allocation of meanings to the acquired subsets of data points can thereby be automated.

In a further exemplary embodiment of the invention, individual objects of the input zone 6 laid out by the user can be defined such that when they are tapped on the input zone 6 in the later acquisition process it is possible to make an additional alphanumeric input via the input/output zone 5 of the template 4, which is likewise stored with the above-named data elements for the corresponding input.

Both the coordinates of the fields of the input area 3, and also the time datum and the possible alphanumeric input are then stored in a combination of the two last-named exemplary embodiments.

Figure 6:
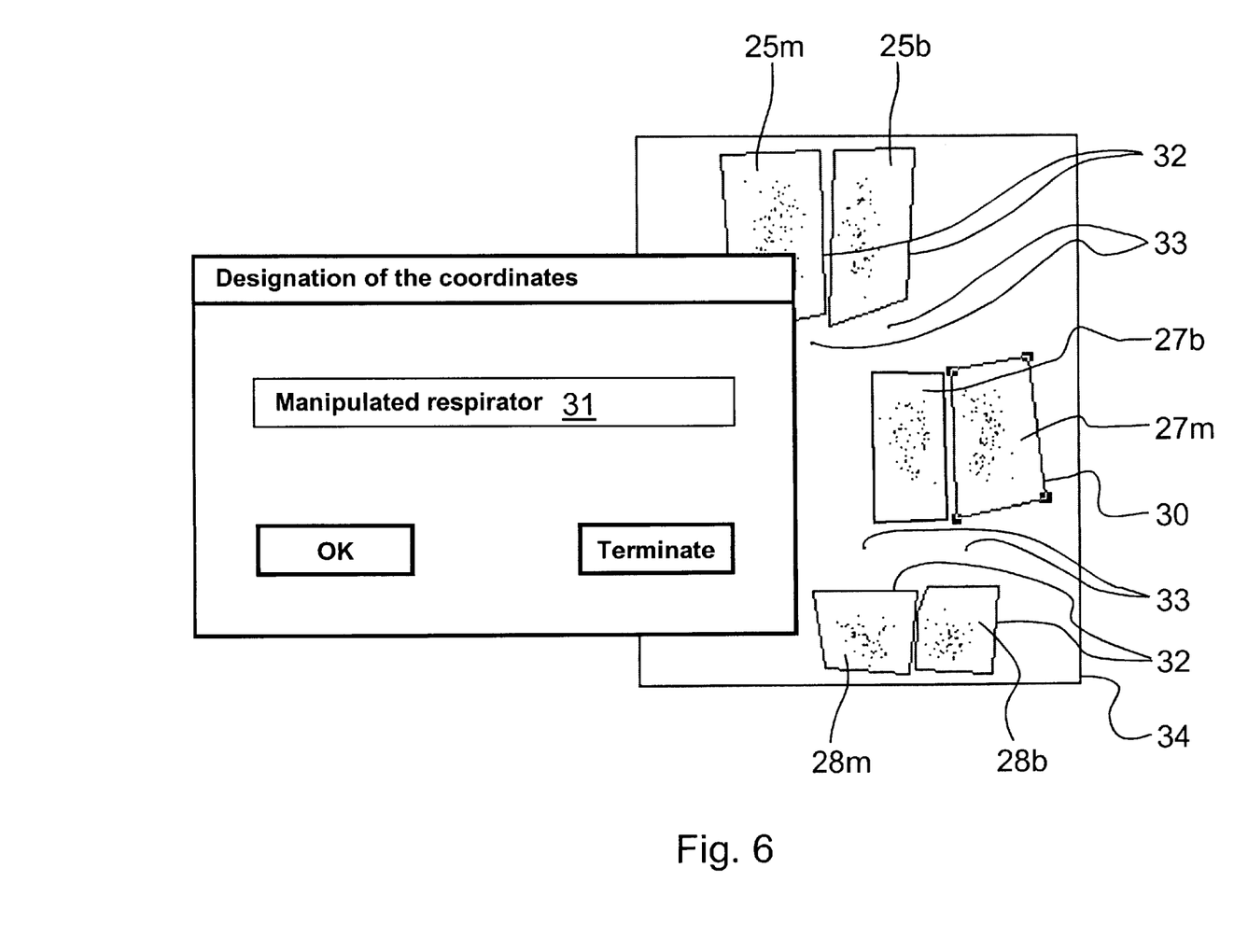
FIG. 6 shows an example of the data evaluation.

In a further embodiment of the invention, the virtual fields 3 are individual points, the input panel 2 being capable of having a resolution of 500×500 points, for example. Inputting on the input zone 6 thus effects an input in the touch-sensitive input panel 2, the coordinates of the touch point of the input panel 2 being stored. The objects drawn on the input zone 6 therefore correspond to sets of points, and an input signifies storage of the point coordinates together with the time datum or other data elements in accordance with the abovementioned exemplary embodiments. At the start of the evaluation, in this exemplary embodiment the stored data are visualized as sets of points in accordance with the acquired coordinates of the input points, with the result that with the aid of the outlay of his template the user can identify these sets of points in terms of their significance and assign them for further evaluation. This identification can be undertaken by the user in a simple way, for example by using the support of the evaluation program in enclosing the areas of the sets of points graphically with a rectangle, circle or polygon, and allocating to the points thus combined the meaning which he had also conceived for this zone on his input zone 6. FIG. 6 shows an example of such an evaluation, the line 34 marking the boundary of the input zone 6. The individual, acquired data records are represented as points on the evaluation display screen in accordance with FIG. 6, the cluster formation effected by the arrangement of the objects on the input zone 6 being clearly in evidence. During the evaluation, fields are laid interactively around the individual clusters, a quadrangular field 30 being defined currently about the cluster 27m in FIG. 6, and the points of this cluster being assigned to class 31 of "manipulation of the respirator". One quadrangular field 32 each has already been laid interactively about the remaining clusters 25m (manipulation of the patient), 25b (observation of the patient), 27b (observation of the monitor), 28m (manipulation of the respirator) and 28b (observion of the respirator), in order to assign the corresponding class to the data records. Represented inside the border 34 are four points 33 which cannot be assigned to the classes mentioned. The location of the anesthetist 23 was acquired by these points. Of course, a multiplicity of such points situated outside the fields 32 can be acquired during the observation. Using these points, the movements of the anesthetist 23 or of a person in space can be recorded relatively accurately by observation.

In a further embodiment of the invention, the user can scan in the visual layout of the input zone 6 and place it optically behind the data records during the evaluation, and this additionally facilitates the assignment of the data records to the objects represented on the input zone 6. In a further embodiment of the invention, the boundary line of the scanned-in objects can be detected automatically, and thereupon the data points situated inside the objects can be automatically assigned to these objects.

The exemplary embodiments described use the template as a separate element. However, in a further exemplary embodiment of the invention, the exemplary embodiments described can also be carried out with the aid of the feature of a template generated directly on the touch-sensitive display surface 2 as electronic display. In this exemplary embodiment, of the application program of the method for data acquisition permits exchange of the template 4 and management of different templates. The representational possibilities of the touch-sensitive display surface 2 of the electronic device 1 restricts the user in his graphical layout of such a template 4.

In a further exemplary embodiment of the invention, in addition to the input surface 2 the data acquisition device 1 has a further input unit 17 which is a keyboard for inputting numerical or alphanumeric data.

In a modification of the last-named exemplary embodiment, the input unit 17 is a switch or a system of switches, for the purpose of controlling the operating system of the electronic device. The switches could be used, for example, to erase or transfer acquired data.

With all the exemplary embodiments described, in addition to data acquisition with the aid of the electronic device 1 the observer has the advantageous option of recording additional data in the form of handwritten notes or sketches on a notepad 11 by using the same pen 8. For this purpose, the observer needs only to actuate the retractable and extendable refill cartridge 9 of the pen 8.

The objects in the input zone 6 can be represented in the most varied way following the rules of set theory, thus as separate objects, as mutually adjacent objects, as mutually overlapping objects or as objects forming subsets and/or supersets.

Instead of the input zones 6 which can be freely laid out, the templates 4 can also already have already prescribed zones with objects represented. Such templates can also contain a photograph, for example. It would be possible, for example, for the purpose of recording physical complaints, for example head complaints, to represent a photograph of the person observing on the template 4, so that by self observation the person can in each case mark on the head the region having the complaint. In addition, it would be possible, for example, to represent on the display 2 a scale of between 0 and 100 units on which the person observing enters the severity of the complaint.

One advantage of the method according to the invention is to be seen in that a new object can be defined at any time on the template during the manual recording. In the simplest embodiment, events which are assigned to the new object are simply marked on a free site on the template. There has previously been no object at this free site. It is not mandatory in this case for the object to be drawn in with a contour line, for example, since the data records assigned to the new object can be detected during the manual evaluation as being arranged outside the existing objects, and can therefore be assigned to the new object. Of course, it is also possible to draw in one or more new objects during the recording, it also being possible to configure the acquisition program in such a way that it automatically detects the drawing of an object and therefore does not assign these input signals to the characterizing data records. For example, the acquisition program could detect the drawing of a closed polygon and detect these data as the contour of an object.

In a further exemplary embodiment, it is also possible to define objects which contain a command or, for example, an item of information for processing the stored data. For example, an object could be defined as an erase function for the purpose of erasing the input last made. It would also be possible, for example, to define an object of "simultaneity", in order to mark that the events previously acquired and stored sequentially occurred simultaneously in fact, so that these events are assigned, for example, the same time of occurrence. Such objects can be defined before the acquisition of measured data, or be defined or drawn in the template at a freely selectable instant during the acquisition of measured data.

In a further exemplary embodiment, all manually drawn objects are configured, for example, as closed polygons, automatically detected by the acquisition program so that during the manual recording the input location on the input panel and the instant of actuation are acquired, and the program thereupon automatically assigns the input location to an object, with the result that in addition to the instant of actuation the input location and/or a designation for the assigned object is stored.

Figure 9A:
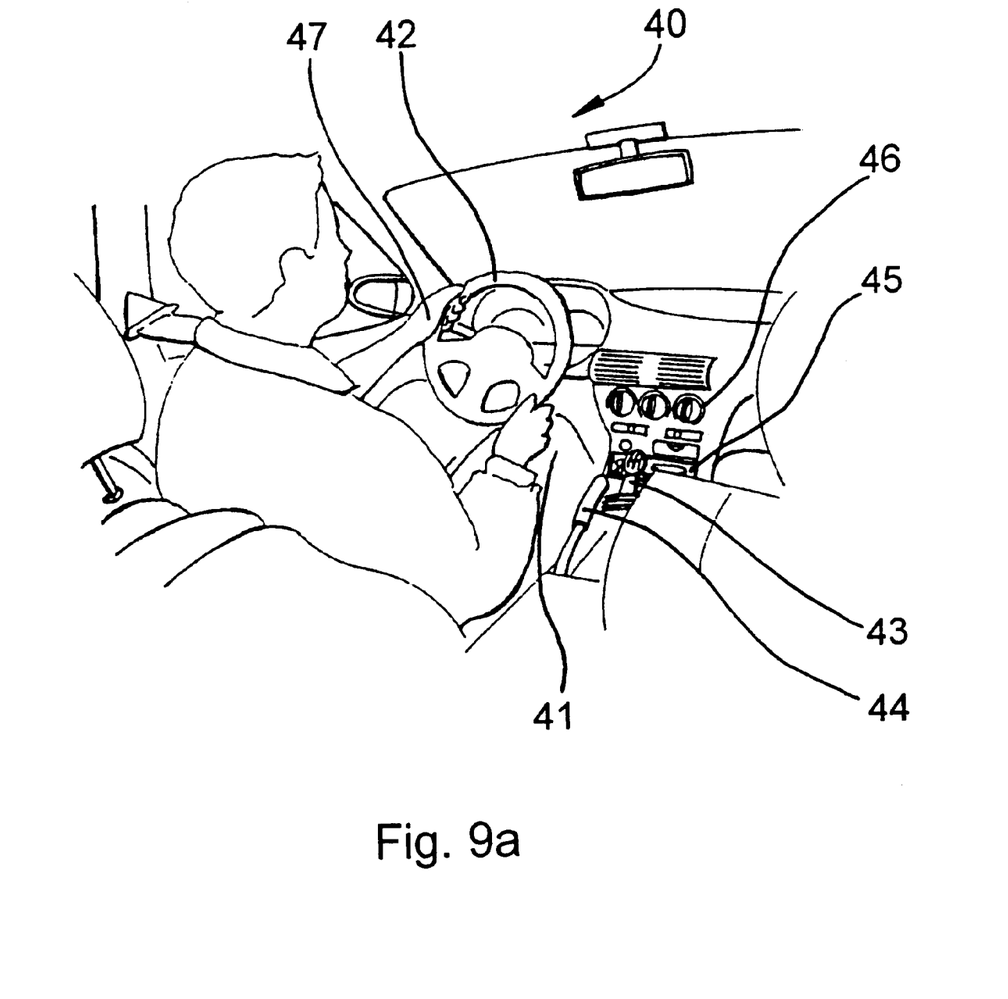
FIGS. 9a, 9b, 9c, 9d, show a further example of data acquisition and evaluation.
Figure 9B:
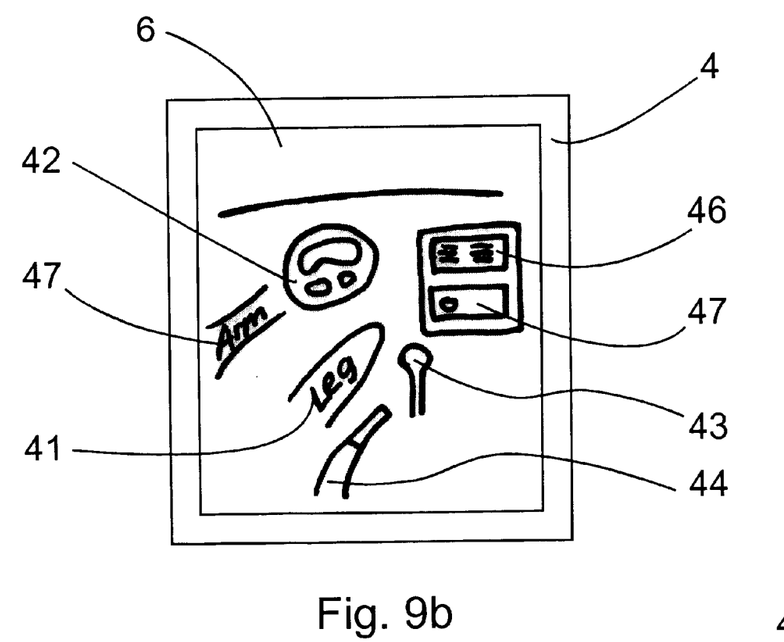
Figure 9C:
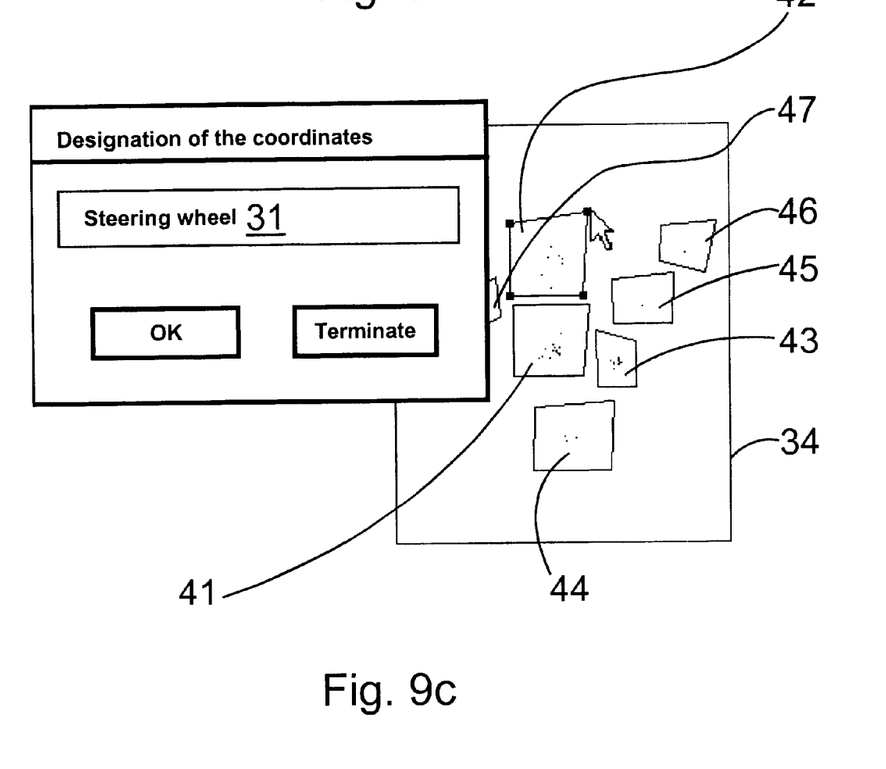

FIGS. 9a, 9b, 9c and 9d show a further example of data acquisition and evaluation. FIG. 9a shows the situation to be observed, an automobile driver 40 at the steering wheel of an automobile. The movements of the right hand are observed, the aim being to record the following events or states: Right hand on:

Leg 41

Steering wheel 42

Transmission shifter 43

Parking brake 44

Radio 45

Ventilation 46

Left arm 47.

Figure 9D:
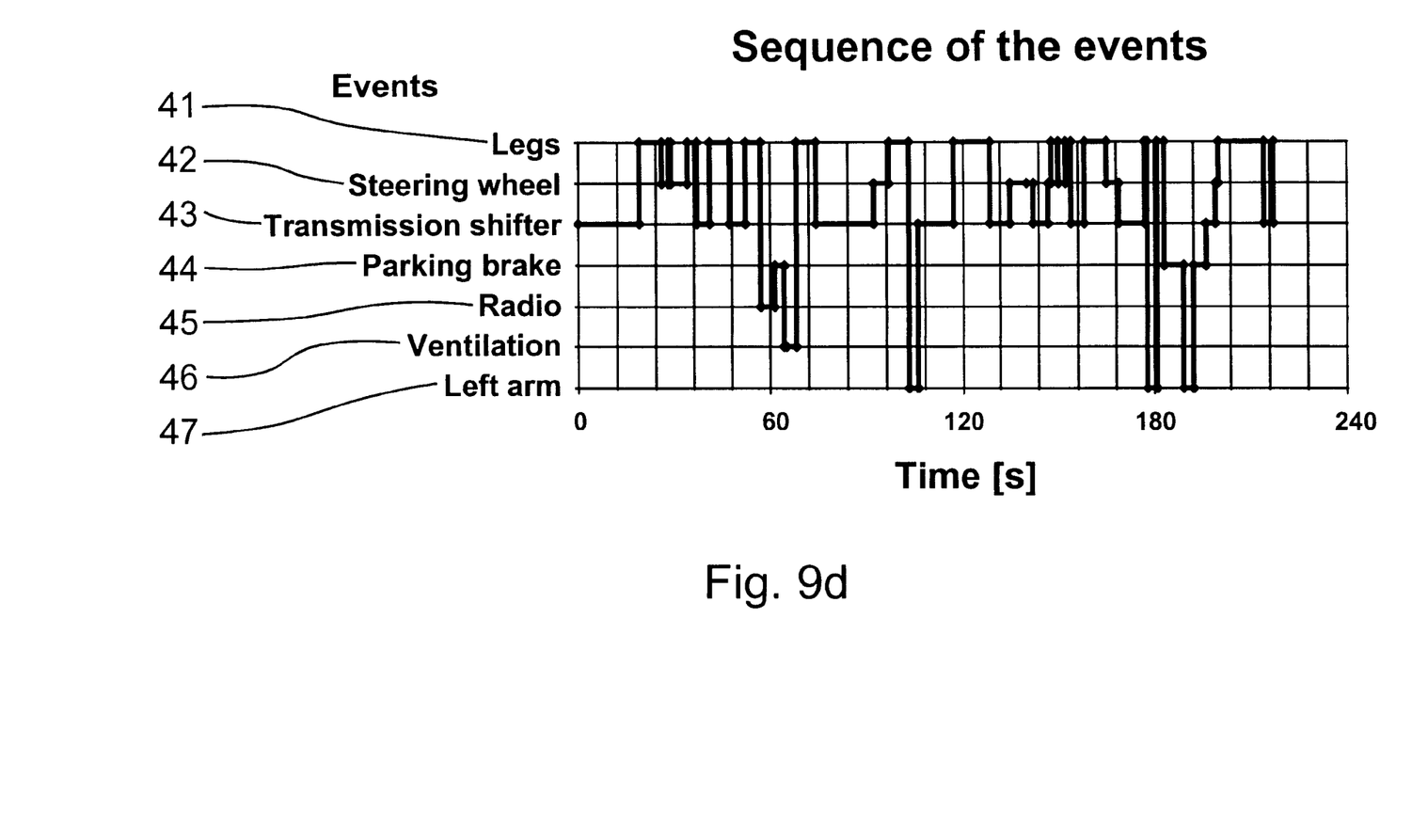

The events and states to be observed have been represented and arranged as objects 41 to 47 graphically in concrete form by the observing person on the template 4, in the input zone 6. Thereafter, the template 4 is mounted on the touch-sensitive input panel 2 of the data acquisition device 1, and the data acquisition is started with the aid of the pen 8 by tapping a start command arranged in the input/output area 5. Depending on the position of the right hand, the appropriate object 41 to 47 is tapped with the tip 9 of the pen 8 during data acquisition, whereupon the data acquisition device 1 stores the corresponding coordinate and the corresponding instant. A stop command arranged in the input/output zone 5 is tapped to terminate the measurement. As may be seen from FIG. 9c, for the purpose of subsequently evaluating the acquired data the latter are represented as data points on a display screen. Taking account of the template 4 in accordance with FIG. 9b, polygons are laid manually around the data points, which are arranged in the form of a cluster, and the data points located therein are assigned to the corresponding classes 31, for example polygon 42, marked with an arrow, of the class of "steering wheel". Thereupon, the acquired data can be evaluated in the most varied way, for example, as represented in FIG. 9d, as an event-time diagram in which the position of the right hand is represented as a function of time.

The invention also relates to a method in a data processing device for manually recording different events or states, the data processing device comprising a display screen, a two-dimensional input device and an operating system, and the method comprising the following steps:

detecting a start signal for activating the data acquisition, detecting the input locations on the two-dimensional input device and storing the corresponding coordinates and the time, detecting a stop signal for deactivating the data acquisition, representing the input locations as points on a display screen, assigning the points to events or states, and, in particular, storing the events or states and the instant of their occurrence.

Figure 10:
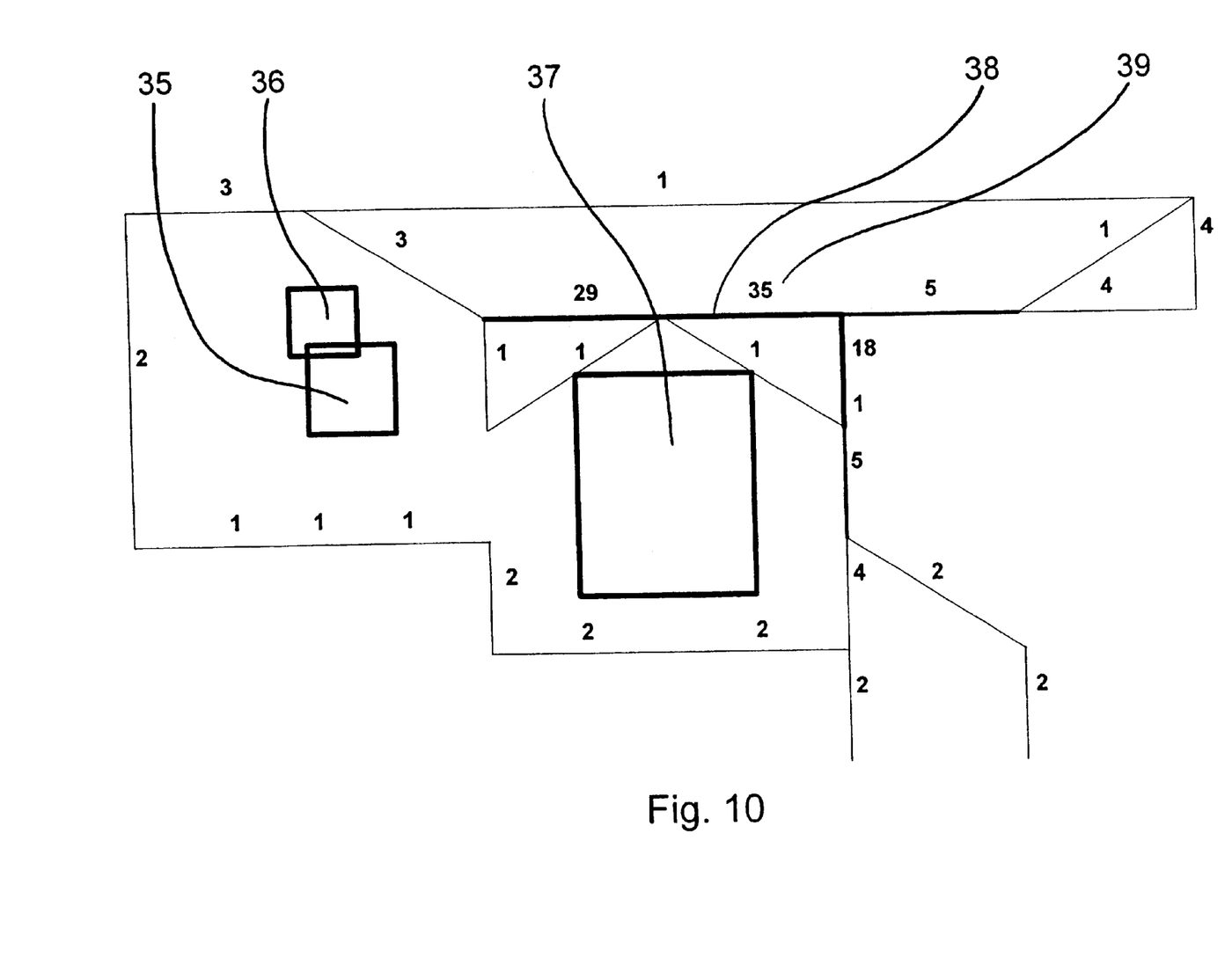
FIG. 10 shows a further example of a representation of results of the observation.

FIG. 10 shows a further example of an evaluation of the acquired data. In accordance with the input zone defined in FIG. 4 and FIG. 6, the points 33 represented by way of example in FIG. 6 are combined as sojourn locations in terms of the frequency and position of their acquisition, and represented as connected by paths 38. The frequency of passage along these paths is represented in FIG. 10 by numbers 39 on the paths 38. The elements (respirator 24, monitor 22, patient 20) assigned in FIG. 3 to the observed situation are represented in FIG. 10 in terms of their contours by means of rectangles as respirator contour 35, monitor contour 36 and operating table contour 37.

In a further exemplary embodiment of the invention, it is possible to use a photography of the situation to be observed as a template. In this embodiment the photography is copied on a thin paper and objects can be defined on this paper, for example by drawing them with a yellow pencil.

In a further exemplary embodiment of the invention, it is also possible to use a projection of a photography on the template. For example in the device disclosed in FIG. 1, the photography could be displayed on the LCD display of input panel 2. In a further embodiment of the invention, it is also possible to use a projection of a motion picture on the template. For example a video of the situation to be observed. In this embodiment the objects can be defined on the template and during observation and acquisition of the date, the observer only has to observe the template, where he can see the projection of the motion picture as well as his objects on the template. In an advantageous refinement of this embodiment, the observer can layout the position of his objects on the template according to relationships between those objects and the projection of the situation to be observed. For example when recording movements or spatially variable events, the observer can layout the position of his objects in relation to the different positions of the observed and moving subject. For example in the device disclosed in FIG. 1, the video showing the motion picture could be displayed on the colordisplay placed behind the input panel 2. The display and the input panel 2 could also have the size of an ordinary video display with a diameter of for example 15" or 20".

What is claimed is:

1. A method for manually recording various observed events or states by an observing person, comprising:

subdividing the various events or states into a plurality of classes in such a way that each of the various events or states can be assigned to a class;

representing an object on a two-dimensional template for each class;

arranging the template in such a way with respect to a two-dimensional input panel of a data acquisition device that an input signal is generated upon manual actuation of the template;

storing a characterizing data record of the input signal comprising coordinates of points touched during the manual actuation of the template; and evaluating the characterizing data records and assigning each recorded event or state to a class after termination of the observation and the manually recording.

2. The method as claimed in claim 1, wherein before starting the manual recording, objects are drawn by hand on the template, and somewhere afterwards classes are assigned to the objects.

3. The method as claimed in claim 2, wherein the objects are represented in accordance with the rules of set theory as objects which are at least one of separate, mutually adjoining, mutually overlapping or forming supersets and subsets.

4. The method as claimed in claim 2, wherein the objects are freely arranged on the template.

5. The method as claimed in claim 1, wherein during the manual recording, the data acquisition device is deactivated so data acquisition is interrupted, wherein an additional object is entered and represented on the two-dimensional template, and wherein data acquisition is reactivated thereafter.

6. The method as claimed in claim 1, wherein the template is represented on a display of a touchscreen.

7. The method as claimed in claim 1, wherein the template includes at least one sheet which can be written on, on the two-dimensional input panel.

8. The method as claimed in claim 1, wherein the characterizing data records are evaluated so the characterizing data records are displayed on a display screen as a representation including points, characterizing the input signal, and wherein clusters which form are assigned to a class.

9. The method as claimed in claim 1, wherein the characterizing data records are evaluated so a position of the objects is detected, and wherein the characterizing data records situated inside the objects are automatically assigned to a class by a computer.

10. The use of a data acquisition device having a flat input panel including a computer, with a touchscreen or a touch pad, for the purpose of carrying out a method as claimed in one of claims 1 to 8.

11. A data acquisition device, comprising:

an input panel of two-dimensional configuration and having a matrix of individually detectable fields or points;

a storage memory configured to store a characterizing data record of the input signal comprising coordinates of the fields or points touched on the input panel; and a template configured to be fitted on the input panel and having a surface which can be written on for manually drawing objects representing various events.

12. The data acquisition device as claimed in claim 11, wherein the input panel comprises a plastic or metal plate including a touchscreen.

13. The data acquisition device as claimed in claim 11, wherein the input panel has more than 1000 individually detectable fields or points.

14. The data acquisition device as claimed in claim 11, wherein the template includes transparent, opaque or areas of different transparency to permit the input panel to be detected or covered.

15. The data acquisition device as claimed in claim 11, wherein the template has areas which prevent actuation of a field or point in the input panel, and has areas which permit actuation of a field or point in the input panel.

16. The data acquisition device as claimed in claim 11, wherein the input panel comprises a touchscreen of a display device, and wherein the objects representing the various events are displayed by the display device, so as to define the objects and to input manually via the input panel.

17. The method as claimed in claim 1, wherein the characterizing data record comprises an instant of actuation of the input panel.

18. The data acquisition device as claimed in claim 11, wherein the memory stores an instant of actuation of the input panel.

* * * * *